United States Patent
Frolov et al.

(10) Patent No.: US 9,397,499 B2
(45) Date of Patent: Jul. 19, 2016

(54) METHODS AND APPARATUS FOR HIGH-FREQUENCY ELECTRICAL POWER COLLECTION AND TRANSFER

(75) Inventors: Sergey V. Frolov, New Providence, NJ (US); Michael Cyrus, Summit, NJ (US); Allan J. Bruce, Scotch Plains, NJ (US)

(73) Assignee: SUNLIGHT PHOTONICS INC., Edison, NJ (US)

( * ) Notice: Subject to any disclaimer, the term of this patent is extended or adjusted under 35 U.S.C. 154(b) by 234 days.

(21) Appl. No.: 13/248,575

(22) Filed: Sep. 29, 2011

(65) Prior Publication Data
US 2012/0019074 A1    Jan. 26, 2012

(51) Int. Cl.
*H01F 38/18* (2006.01)
*H02J 3/38* (2006.01)
*H02J 5/00* (2016.01)
*H02J 3/34* (2006.01)

(52) U.S. Cl.
CPC . *H02J 3/383* (2013.01); *H02J 3/34* (2013.01); *H02J 5/005* (2013.01); *Y02E 10/563* (2013.01); *Y02P 80/11* (2015.11); *Y10T 307/50* (2015.04); *Y10T 307/707* (2015.04)

(58) Field of Classification Search
CPC .... H02J 3/34; H02J 3/08; H02J 3/381–3/387; H02J 3/40; H02J 3/42; H02J 3/44
USPC ....................................... 307/82–84; 363/163
See application file for complete search history.

(56) References Cited

U.S. PATENT DOCUMENTS

| | | | | |
|---|---|---|---|---|
| 4,328,429 A | * | 5/1982 | Kublick | 307/58 |
| 4,874,961 A | * | 10/1989 | Henderson | 307/87 |
| 5,668,713 A | * | 9/1997 | Eguchi et al. | 363/95 |
| 5,856,712 A | * | 1/1999 | Suzuki et al. | 307/64 |
| 7,672,149 B2 | * | 3/2010 | Falk | 363/98 |
| 9,224,535 B2 | * | 12/2015 | Dermark | H01F 38/18 |
| 2004/0159102 A1 | * | 8/2004 | Toyomura et al. | 60/641.8 |
| 2005/0040711 A1 | | 2/2005 | West | |
| 2007/0093280 A1 | * | 4/2007 | McKay | 455/574 |
| 2009/0000654 A1 | * | 1/2009 | Rotzoll et al. | 136/244 |
| 2010/0084924 A1 | * | 4/2010 | Frolov et al. | 307/82 |
| 2010/0148578 A1 | * | 6/2010 | Wagoner et al. | 307/17 |

FOREIGN PATENT DOCUMENTS

EP    1 921 741 A2    5/2008
GB    2455755 A    *    6/2009

OTHER PUBLICATIONS

Advanced High Frequency AC Microgrid with Integrated Power Quality Conditioning Capability, Ferrigolo et al., Copyright IEEE 2009. 978-1-4244-4649-0/09, pp. 178-183.*

(Continued)

*Primary Examiner* — Fritz M Fleming
(74) *Attorney, Agent, or Firm* — Moser Taboada; Alan Taboada

(57) ABSTRACT

Methods and apparatus for supplying power to an electrical line or grid by using high-frequency alternating current (HFAC) are provided herein. In some embodiments, an apparatus for collecting and transmitting electrical power to an AC line operating at a line frequency may include a plurality of high frequency AC power sources; a high frequency AC bus, connected to each of the high frequency AC sources; and a line frequency converter, the input of which is connected to the high frequency AC bus and the output of which is connectable to the AC line.

24 Claims, 10 Drawing Sheets

(56) References Cited

OTHER PUBLICATIONS

Circulating Current Minimizationh in High-Frequency AC Power Distribution Architecture with Multiple Inverter Modules Operated in Parallel, Ye et al., Copyright 2007 IEEE, 0278-0046, pp. 2673-2687.*

High Frequency AC Power Distribution in Space Station, Tsai et al., Copyright 1990 IEEE, 0018-9251/90/0300-0239, pp. 239-253.*

Power Electronics Interface for Integrating Multiple Distribute Generators, Ozpineci et al., Oak Ridge National Laboratory, May 14, 2003.*

High Frequency Alternating Current Power Distribution, Joseph Drobnik, Copyright IEEE 1994, 0-7803-2034-4/94.*

"A Novel Utility Interfaced High Frequency Link Photovoltaic Power Conditioning System", Bhat et al., IEEE Transactions on Industrial Electronics, vol. 35, No. 1, Feb. 1988, 0278-0046/88/0200-0153, copyright 1988 IEEE.*

Distributed Intelligent Energy Management System for a Single-Phase High Frequency AC Microgrid, Chakraborty et al. IEEE, copyright 2007, 0278-0046/$25.00. IEEE Transactions on Industrial Electronics, Vo. 54, No. 1, Feb. 2007.*

Takahashi and Su, "A 500 Hz Power System—Applications", 1989 IEEE, 89CH2792-0/89/0000-0996.*

Fukao and Matsui (Fukao et al.) , "Basic Characteristics of Cycloconverter for Linking Commercial and High-Frequency Distribution Lines", 1987 IEEE, 0093-9994/87/0900-0927.*

Sood and Lipo and Hansen (Sood et al.), "A Versatile Power Converter for High Frequency Link Systems", 1987 IEEE, CH402-6/87/000-0249.*

Matsui and Akiyama (Matsui et al.), "A Basic Study on a Parallel Resonant Link COnverter for a High Frequency Link System", 1997 IEEE, 0-7803-3823-5/97.*

International Search Report and Written Opinion dated Jun. 13, 2013 for International Application No. PCT/US2012/057558.

Ye Zhongming et al., "Multiple Resonant Inverters In Parallel With a Novel Current Sharing Control Based on Current Decomposition Method", Power Electronics Specialists Conference, Jun. 2006, 7 pages.

S.K. Mazumder et al., "a Direct FE™ based High-Frequency Fuel-Cell Inverter", Applied Power electronics Conference and Exposition, 2009, IEEE, pp. 1805-1812.

Soeren Baekhoej Kjaer et al., "A Review of Single-Phase Grid-Connected Inverters for Photovoltaic Modules", 2005, IEEE, pp. 1292-1306.

\* cited by examiner

1200

1300

METHODS AND APPARATUS FOR HIGH-FREQUENCY ELECTRICAL POWER COLLECTION AND TRANSFER

FIELD

The present invention relates generally to methods and apparatus for supplying power to an electrical line or grid by using high-frequency alternating current (HFAC), and particularly to methods and apparatus for collecting HFAC energy from photovoltaic devices and supplying it into a utility grid.

BACKGROUND

One of the major contributors to current worldwide generation of renewable energy is the solar energy produced via a photovoltaic (PV) effect. PV-based renewable-energy sources generate energy, in the form of electricity, by harnessing electromagnetic radiation, such as sunlight. PV applications are not limited to any particular area of the world and/or any given sector of economy. In remote regions of the world, for example, an off-grid installation of the PV source provides the only available source of electricity. In highly populated and/or economically developed regions, the PV source may, for example, source electricity to an electrical grid to supplement and/or reduce the amount of conventional energy distributed from the electrical grid. A PV source is in general any electric system containing a PV device, such as a PV cell or a PV module.

Most modern PV systems collect and aggregate all direct-current (DC) power from individual solar panels before converting it to the alternating-current (AC) form using a central inverter operating a line frequency of an AC grid. In another approach, each PV module may be equipped with a separate, independently controlled micro-inverter that produces AC power locally and thus can be directly connected to an AC grid. The main advantage of the central-inverter approach is its relatively lower cost; however, this approach has a lower energy yield. The main advantage of the micro-inverter approach is a higher energy yield, while its drawbacks include higher manufacturing costs.

The inventors believe that other PV system architectures are needed that could reduce overall system costs and at the same time enhance performance, safety and reliability. Furthermore, different system approaches are also needed in order to ensure that the solar and other renewable technologies can be integrated into the grid at high penetrations and in a safe and reliable manner. Such approaches would require alternative system architectures and power electronics topologies, which will provide not only an attractive combination of benefits of legacy systems, but also new and advanced functionalities addressing issues related to the interconnection between a PV system and a utility grid.

SUMMARY

Methods and apparatus for supplying power to an electrical line or grid by using high-frequency alternating current (HFAC) are provided herein. In some embodiments, an apparatus for collecting and transmitting electrical power to an AC line operating at a line frequency may include a plurality of high frequency AC power sources; a high frequency AC bus, connected to each of the high frequency AC sources; and a line frequency converter, the input of which is connected to the high frequency AC bus and the output of which is connectable to the AC line.

In some embodiments of the invention, methods for collecting and transmitting electrical power to an AC line, which operates at a line frequency, are provided. In some embodiments, a method for collecting and transmitting electrical power to an AC line, which operates at a line frequency, may include providing high frequency AC power at different locations; collecting the high frequency AC power onto a common bus; and converting the high frequency AC power from the common bus into line frequency AC power; and injecting the line frequency AC power into the AC line.

In some embodiments, a method for producing a high frequency AC power system may include providing a plurality of high frequency AC power sources; connecting outputs of the high frequency AC power sources to a common bus; connecting the common bus to the input of at least one line frequency converter; and providing connections from an output of the line frequency converter to a an AC line.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
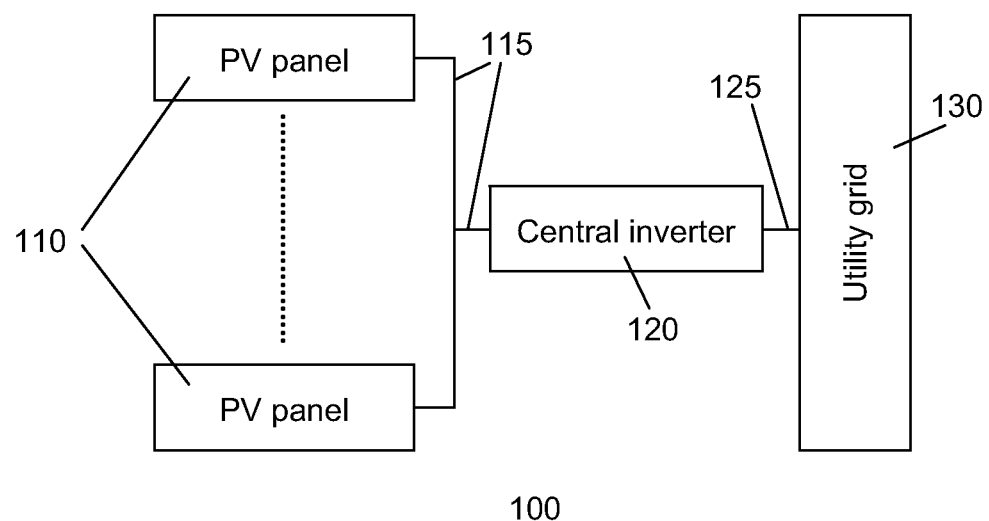
FIG. 1 is a schematic diagram of a conventional PV system for aggregating DC power from individual solar panels before converting it to the AC form using a central inverter.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

Most PV systems today aggregate all DC power from individual solar panels before converting it to the AC form using a central inverter as shown in FIG. 1. In this case the PV system 100 consists of several PV modules or panels 110 that are connected via DC cabling 115 to a central inverter 120. The inverter 120 in turn converts the electrical power provided by the panels 110 from the DC form to the AC form and injects it via AC wiring 125 into AC utility grid 130. In this drawing and the following drawings the power flow is typically unidirectional and going from the left side to the right side of a drawing unless noted otherwise. The PV modules 110 may be connected electrically in series, in parallel or both, in order to produce a desired DC voltage before the inverter 120. This arrangement limits the capabilities of an inverter to maximize the output powers of PV modules due to their different characteristics and operating conditions, thus resulting in a relatively lower energy yield.

Figure 2:
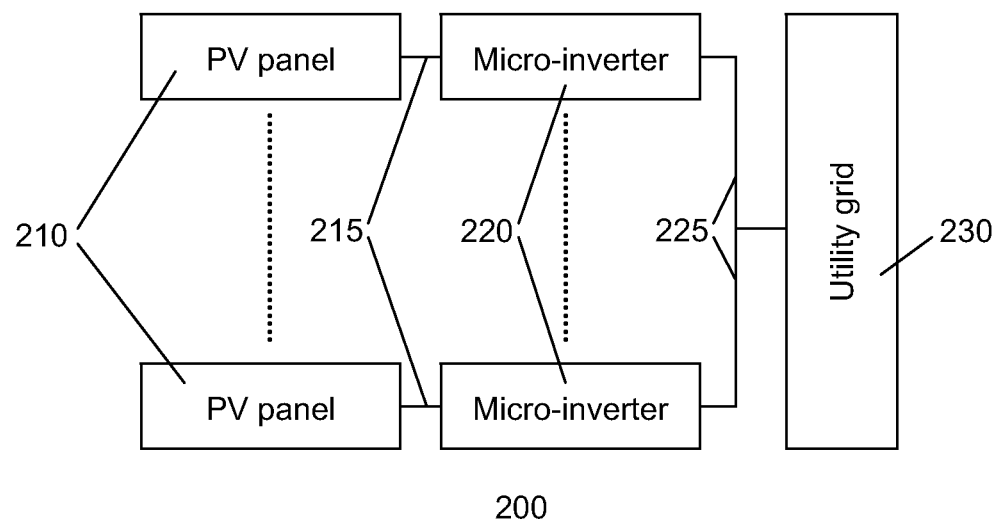
FIG. 2 is a schematic diagram of a conventional PV system, where PV modules are equipped with separate, independently controlled micro-inverters that produce AC power locally and directly connected to the AC grid.

In the other (less frequent) approach, each PV module may be equipped with a separate, independently controlled line-frequency micro-inverter that produces AC power locally and thus can be directly connected to an AC grid as shown in FIG. 2. In this case the PV system 200 comprises several PV modules or panels 210 that are connected directly to individual inverters or micro-inverters 220 via short sections of DC wiring 215. Subsequently, the inverters 220 are separately converting DC power from each panel 210 into AC power, which is then injected into AC grid 230 at a common AC line voltage. The power conversion processes at each micro-inverter 220 are independent, which makes it possible to improve the performance of PV system 200 in comparison to that of PV system 100.

Figure 3:
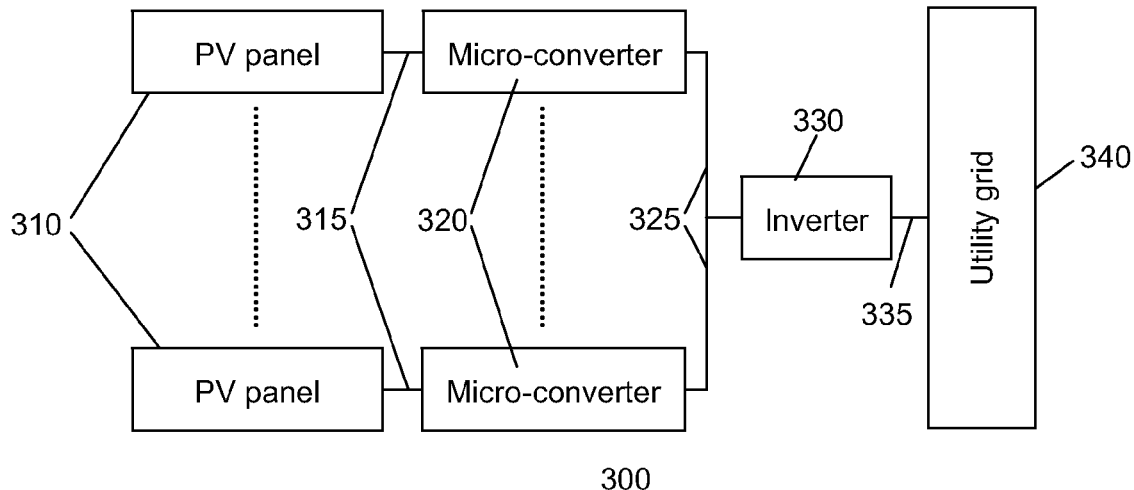
FIG. 3, is a schematic diagram of a prior art PV system using DC-DC micro-converters and a central inverter connected to a utility grid.

The main advantage of the central-inverter approach (FIG. 1) is its relatively lower cost, while the main advantage of the micro-inverter approach (FIG. 2) is its higher energy yield. An alternative approach has been proposed as shown in FIG. 3, where PV system 300 comprises several PV modules or panels 310, DC wiring 315, DC-to-DC micro-converters 320, DC wiring 325, a common DC-to-AC inverter 330 and AC wiring 335 connected to utility grid 340. Individual micro-converters 320 provide independent power optimization for each PV panel 310 potentially improving the system performance. However, this approach is not practical and in fact has not been implemented so far, because of expensive micro-converters and DC cabling which make this approach uneconomical. System 300 may be also less efficient in comparison with systems 100 and 200, as some of the functionalities are duplicated between the micro-converter and the inverter, e.g. AC/DC conversion stages.

This invention provides a more attractive alternative approach and shows an economical way to combine the advantages of PV systems with central inverters and micro-inverters. In accordance with embodiments of the present invention, methods and apparatus are provided that use high-frequency alternating current (HFAC) as efficient means for processing, collecting and aggregating power and energy from the solar panels and other energy sources and for delivering the accumulated power and energy to a utility grid. High frequency operation generally reduces the size and weight of passive components, such as transformers and inductors, which are large, heavy, and costly at lower frequencies. As used herein, AC frequencies larger than about 60 Hz are generally considered to be in the high frequency range (and, similarly, AC frequencies at or less than about 60 Hz are generally considered to be in the low frequency range). The choice of the exact frequency is in part determined by the system size and details of its design; however, it may be preferable to choose frequencies in the range of 1-100 kHz.

Figure 4:
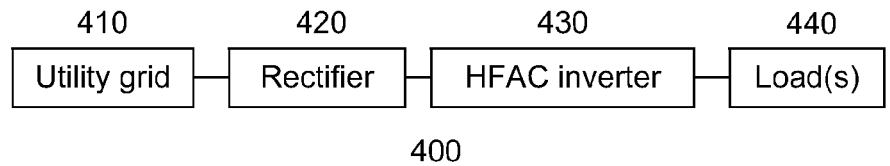
FIG. 4 is a schematic diagram of a conventional high-frequency alternating current (HFAC) power distribution approach.

HFAC power distribution systems have been considered for some applications, e.g. as a replacement for DC-DC links in computer systems and electronic instrumentation. FIG. 4 illustrates an HFAC power distribution approach that has been implemented in such cases, where an HFAC system 400 may comprise a power source such as a utility grid 410, a rectifier 420, high-frequency (HF) inverter 430 and one or more loads 440. Such HFAC systems are limited in their capabilities, as they are only able to extract electrical power from a voltage-stabilized AC grid and distribute it among various fixed internal loads. They are not capable to do the reverse, i.e. to inject electrical power into the AC grid.

Figure 5:
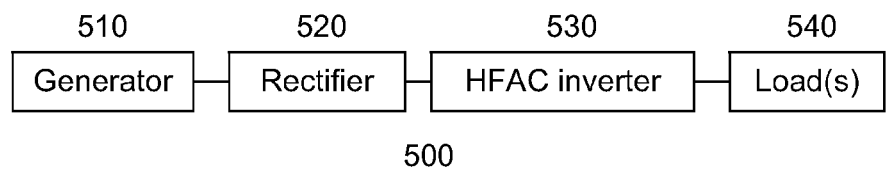
FIG. 5 is a schematic diagram of a conventional HFAC power distribution layout used in automotive industry and space-borne platforms.

Other HFAC applications include automotive industry and space-borne platforms, in which HFAC systems have a layout similar to a system 500 shown in FIG. 5. HFAC system 500 comprises a power source such as a generator 510 or other sources, a rectifier 520, HF inverter 530 and one or more loads

540. This type of HFAC system 500 can also use solar panels as its additional power source. However, both systems 300 and 400 can only provide electrical power to their fixed internal loads. They are not able to provide power to external loads, or serve as an auxiliary power source to a utility grid. Both systems 300 and 400 are relatively compact, i.e. their intended use is in confined, space-restricted environments, so that all power electronics components can be controlled and regulated from a single or central controller. Alternatively, very large HFAC systems, such as HFAC micro-grids, have been proposed, where large sections of the AC utility grid can be simply replaced by HFAC components. HFAC micro-grids mimic the operation of a regular AC grid or an AC micro-grid, but operate at a frequency that is greater than the regular utility line frequency of 50/60 Hz (in most parts of the world it is 50 Hz, although in the Americas it is typically 60 Hz), e.g. 400-500 Hz. In this case, the operation and design of such a HFAC system is very similar to a regular AC power system and all its potential benefits stem only from the use of a relatively higher line frequency. However, poor availability or lack of special HFAC components needed for their implementation makes HFAC micro-grids expensive. In addition, there are only few applications that can benefit directly from HFAC micro-grids. As a consequence, they have not been used in practice.

Figure 6:
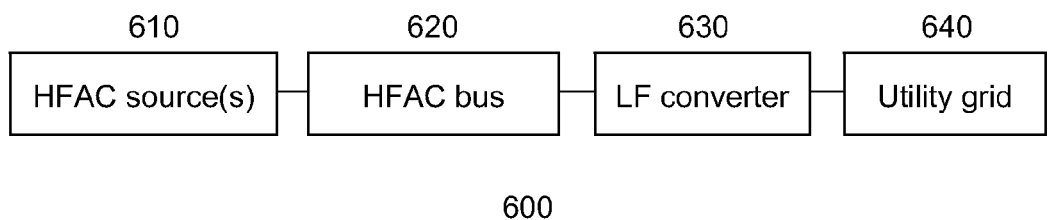
FIG. 6 illustrates a schematic diagram of a HFAC power system which may be configured to supply electrical power to a common utility grid in accordance with some embodiments of the present invention.
Figure 7:
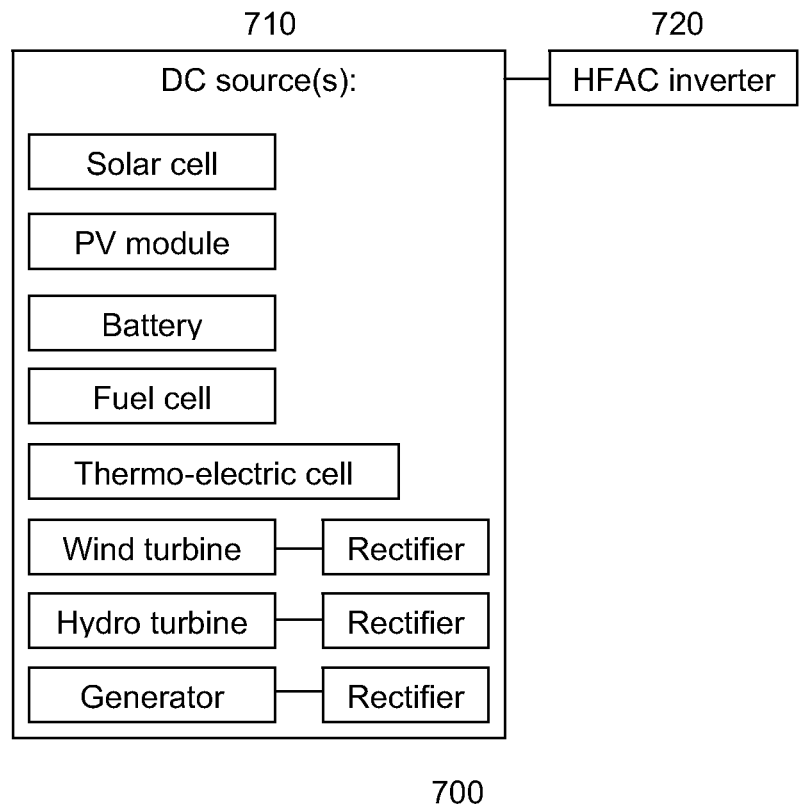
FIG. 7 illustrates a schematic diagram of HFAC sources which may be produced by coupling various DC sources to an HFAC inverter in accordance with some embodiments of the present invention.
Figure 8:
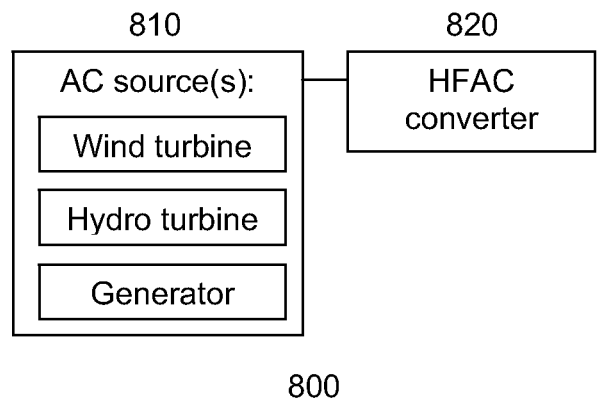
FIG. 8 illustrates a schematic diagram of an AC source which may be coupled to a HFAC converter in accordance with some embodiments of the present invention.

In accordance with at least some embodiments of the present invention, any source of electrical power, particularly but not limited to renewable power such as solar power, may be configured to supply electrical power to a common utility grid as shown in FIG. 6. In this case HFAC apparatus 600 comprises one or more HFAC sources 610, HFAC interconnection common bus 620, line-frequency (LF) converter 630, and a connection to the utility grid 640. Each solid line connecting different elements of the apparatus 600 in the schematic drawing of FIG. 6 represents at least one electrical connection via an electrical connector, cable or other wiring. Also, some of the electrical connections may be achieved via a wireless electrical power transfer. The HFAC power system 600 supplies electrical power to the grid, where it is distributed to external loads. HFAC sources may include source 700 shown in FIG. 7, which may comprise any number of DC sources 710, such as a solar cell or module, a battery, a fuel cell, a thermoelectric cell, and others, and an HFAC inverter 720. Instead of a DC source, one may use an AC source, such as a wind- or a hydro-turbine, or a generator, followed by a rectifier or HFAC converter, e.g. a cycloconverter, as shown in FIG. 8.

Figure 9:
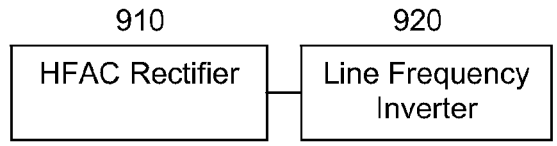
FIG. 9 illustrates a schematic diagram of an exemplary line frequency (LF) converter having an HFAC rectifier connected to an LF inverter in accordance with some embodiments of the present invention.

The HFAC bus 620 and the grid connection 640 may be single or three-phase power lines. The HFAC bus 620 serves as means for collecting HFAC power from HFAC sources 610 and transferring it to the LF converter 620. The LF converter 620 provides the conversion of this electrical power into the regular AC form, so that it can be injected into the regular AC line, which can be an AC utility grid or an AC micro-grid operating at the line frequency of 50/60 Hz. An exemplary LF converter 900 is shown in FIG. 9, comprising an HFAC rectifier 910 connected to an LF inverter 920. The HFAC rectifier 910 is used to rectify the HFAC power and produce a DC voltage, which is subsequently used in the inverter 920 to produce the AC power at the line frequency (e.g. 50 or 60 Hz). The HFAC rectifier 910 may be a rectifying diode bridge, an active switch bridge, or other power electronic elements that can perform electrical current rectifying functions.

Figure 10:
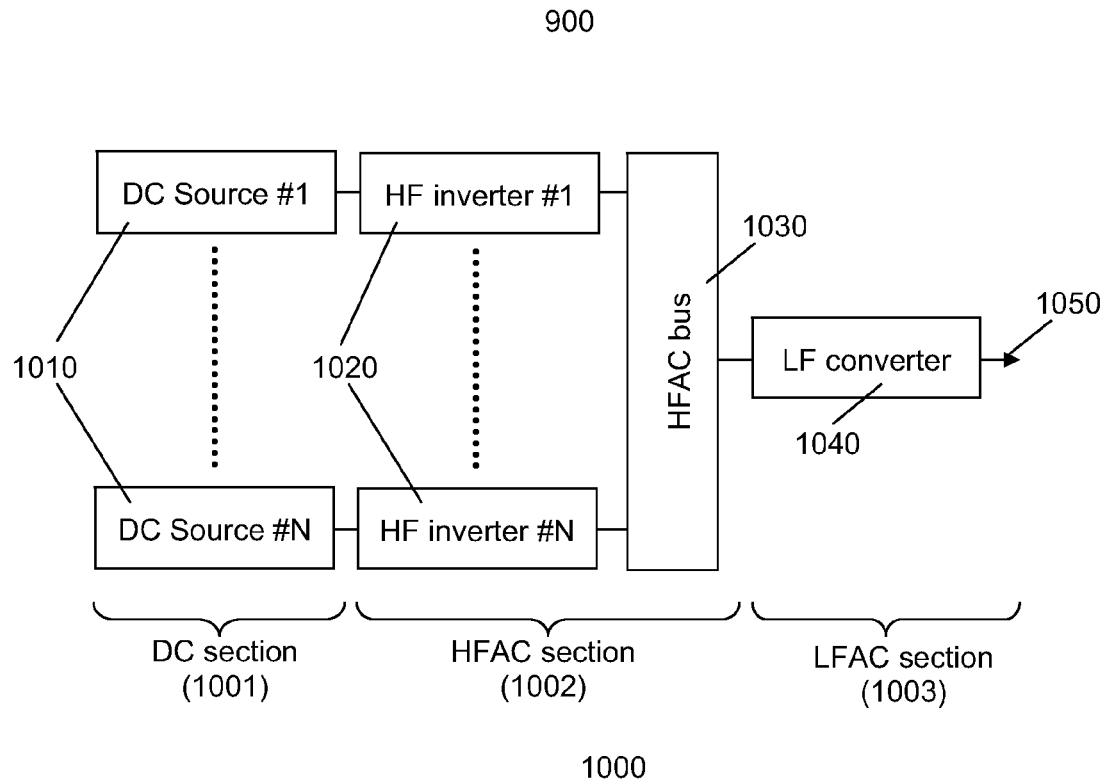
FIG. 10 illustrates a schematic layout of a HFAC photovoltaic (PV) system in accordance with some embodiments of the present invention.

FIG. 10 shows a schematic layout of a HFAC PV system 1000, comprising a DC section 1001, an HFAC section 1002 and an LFAC section 1003. The DC section 1001 includes solar PV cells and modules 1010 and any DC wiring necessary for their interconnections. The intermediate HFAC section 1002 includes HF micro-inverters 1020 and an HFAC common bus 1030. The LFAC section 1003 comprises an LF converter 1040 and an electrical grid connection 1050. HF micro-inverters 1020 are connected to one or more PV panels 1010, providing independent MPPT (maximum power point tracking) control; they can be physically located next to a corresponding PV cell/module and mechanically attached to a panel or its mount. Each micro-inverter may be connected to one or more PV cells or modules. HF micro-inverters 1020 are connected in parallel to the HFAC bus 1030 using appropriate HFAC wiring, each micro-inverter converting DC power from a corresponding PV panel into HFAC power. In general, this conversion may occur at a common HFAC frequency in the range of 1-100 kHz, potentially extending into the MHz range. HFAC bus power is further transferred to the LF converter 1040, where the electrical power is down-converted to the line frequency AC form. Subsequently, the resulting AC power is fed into the utility grid, using the electrical connection 1050. This HFAC PV system may be a single-phase, multi-phase or hybrid system, where for example the HFAC bus can be a single-phase line and the AC grid is a three-phase line or vice versa.

Some elements of the HFAC PV system 1000 may be spatially co-located, i.e. be separated by distances much smaller compared to the overall size of the system (for example, by distances ranging from few meters down to zero, in which case they may be mechanically attached to each other or common support structures). Other elements in this system may be spaced further apart and located at various distances from each other spanning the range of few meters to several kilometers or miles. The physical size of the system is determined by the largest distance separating any two of its elements. For example, any given micro-inverter 1020 may be co-located with a corresponding PV panel 1010, thus reducing the length of DC wiring between the two. On the other hand, different PV panels 1010 may be located in different places and spaced far apart (e.g. tens or hundreds meters apart). Similarly, the LF converter may be located either close to one of the panels 1010 or micro-inverter 1020, or far from any of them. The HFAC bus 1030 then may cover the extent of the physical area (e.g. a ground surface area or a man-made structure such as a building) in which the HFAC PV system 1000 is located, thus providing electrical connections between elements of this system that are spaced apart, e.g. a connection between a micro-inverter 1020 and the LF converter 1040. The HFAC bus 1030 may comprise one or more electrical cables rated to carry HFAC power from at least all PV panels and other additional (optional) power sources.

Figure 11:
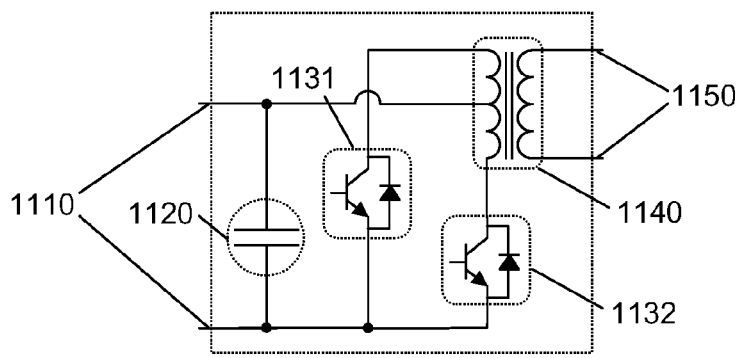
FIG. 11 illustrates a schematic diagram of an inverter suitable for use in HFAC PV systems in accordance with some embodiments of the present invention.
Figure 12:
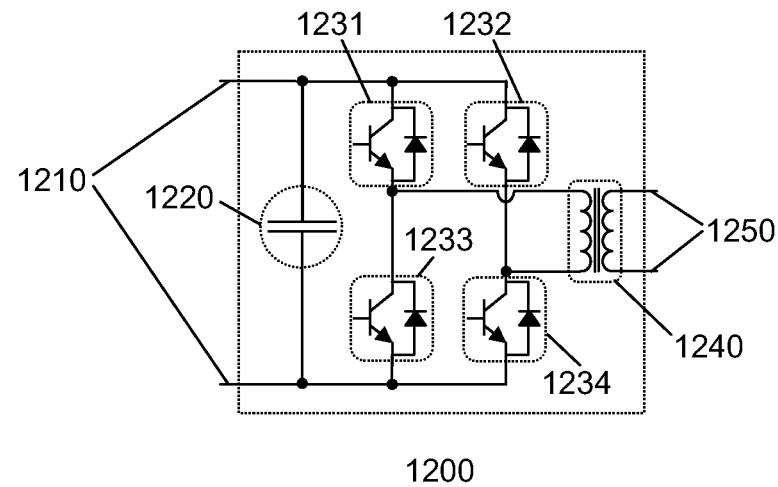
FIG. 12 illustrates a schematic diagram of an inverter suitable for use in HFAC PV systems in accordance with some embodiments of the present invention.
Figure 13:
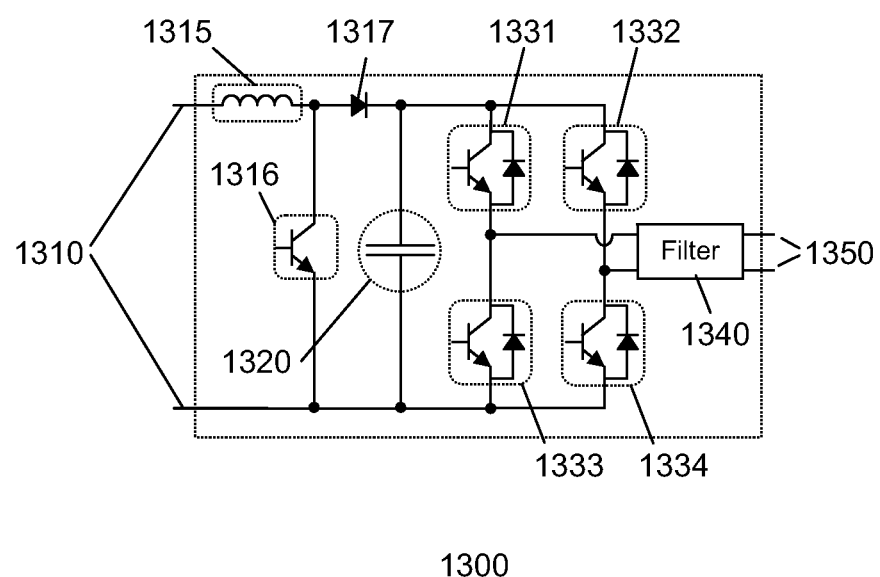
FIG. 13 illustrates a schematic diagram of an inverter suitable for use in HFAC PV systems in accordance with some embodiments of the present invention.

Both HF and LF inverters may be implemented using a number of different design approaches utilizing pulse-width modulation techniques (PWM). For example, FIG. 11 shows an inverter 1100 built using a half-bridge design comprising several main components, particularly a capacitor 1120, switches 1131 and 1132, and a transformer 1140. Inputs 1110 can be connected to a DC source or a DC link, whereas outputs 1150 can be connected to HF/LF AC wiring or other AC power electronics. Also, FIG. 12 shows an inverter 1200 built using a full-bridge design comprising several main components, particularly a capacitor 1220, switches 1231, 1232, 1233 and 1234, and a transformer 1240. Inputs 1210 can be connected to a DC source or a DC link, whereas outputs 1250 can be connected to HF/LF AC wiring or other AC power electronics. Of course many other inverter topologies may be used, including transformerless topologies, such as an inverter 1300 shown in FIG. 13. Inverter 1300 comprises an inductor 1315, a diode 1317, a capacitor 1320, switches 1316,

1331, 1332, 1333, 1334, and a low-pass frequency filter 1340. Inputs 1310 can be connected to a DC source or a DC link, whereas outputs 1350 can be connected to HF/LF AC wiring or other AC power electronics. A number of different switching devices or switches may be used in these power electronics elements, such as Insulated Gate Bipolar Transistors (IGBT), Metal-oxide Semiconductor Field-effect Transistors (MOSFET), thyristors, Gate Turn-Off (GTO) switches and others. Also, the HF transformer design and other circuit elements and devices may be optimized for efficient operation at high frequencies, including the frequency range around at least one specific high frequency (e.g. an HFAC operating frequency).

Figure 14:
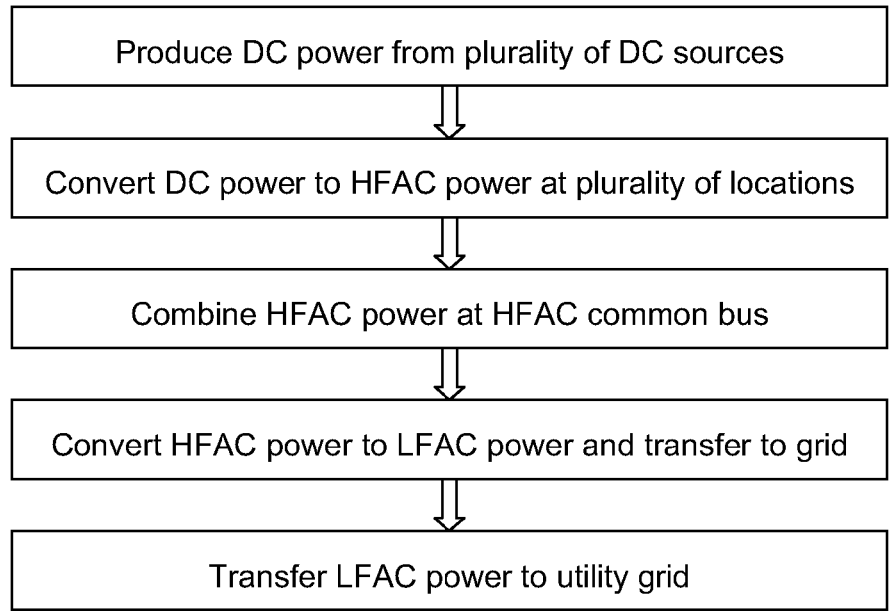
FIG. 14 is a method for delivering power to a grid from multiple sources in accordance with some embodiments of the present invention.

In accordance with at least some embodiments of the present invention, method 1400 shown in FIG. 14 for delivering power to a grid from multiple sources is provided comprising the steps of (1) producing DC power from multiple DC power sources, e.g. PV modules, (2) converting DC power from these sources into HFAC power at different locations, preferably close to the locations of respective DC sources, e.g. using HF micro-inverters near the PV modules, (3) combining the converted HFAC power onto the same common HFAC bus, (4) converting HFAC power to LFAC power, e.g. using one or more LF converters, and (5) transferring the LFAC power to a utility grid or another voltage-stabilized AC power line (e.g. a micro-grid). There may be additional steps in the described methods, such as synchronizing HFAC powers at different locations, maximizing real HFAC power in the HFAC bus, and others. The HFAC-to-LFAC power conversion may take place in locations different and remote from the locations of the DC sources and HF micro-inverters.

Figure 21:
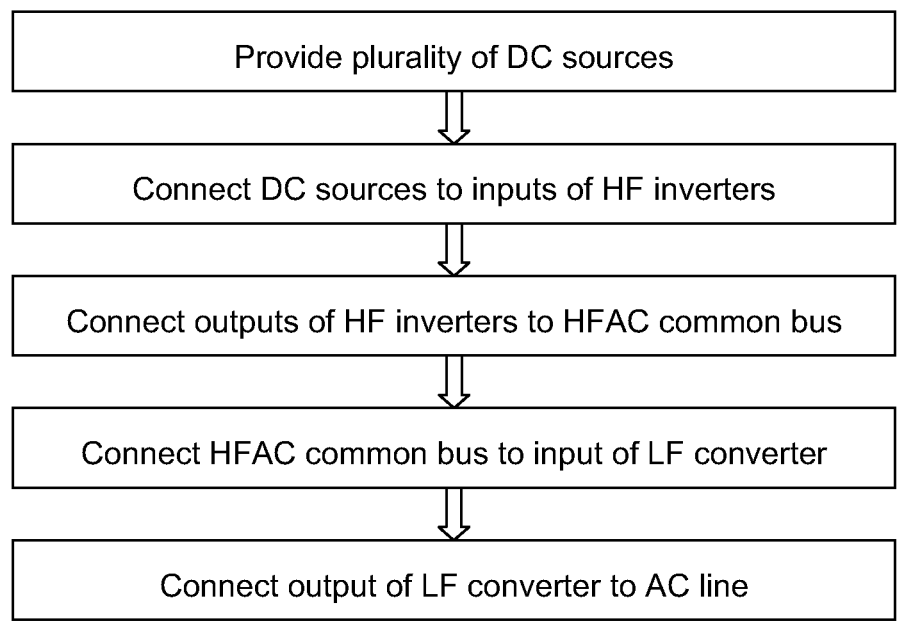
FIG. 21 is a method for making an HFAC system in accordance with some embodiments of the present invention.

In accordance with at least some embodiments of the present invention, method 2100 shown in FIG. 21 for making an HFAC power system is provided comprising the steps of (1) providing a plurality of DC sources, (2) connecting the DC sources to inputs of HF inverters, (3) connecting outputs of the HF inverters to a common HFAC bus, (4) connecting the HFAC bus to the input of at least one LF converter, and (5) providing connections from and/or connecting the output of the LF converter to a regular AC line. Additional steps may include providing transmitters and receivers for wireless electrical connections and power transfer between inverters and HFAC bus, LF converter and HFAC bus, different parts of HFAC bus, and other parts of the HFAC system. Further additional steps may include utilization of existing AC wiring at some or all of the locations of DC sources, HF inverters, HFAC bus and LF converters, as means for transferring HFAC power, i.e. as an HFAC bus, or AC power. Such AC wiring may exist for example in a building, where the method 2100 is used for the installation or modification of a HFAC system (e.g. an HFAC PV solar power system). Existing AC wiring may have been used for other purposes before the installation of the HFAC system, such as for example transfer and distribution of the AC power inside the building. Such wiring may be suitable for transfer of HFAC power as well.

The HFAC bus is unlike any regular electrical power line in that it is operated at a higher frequency and it lacks any actual electrical loads such as those in AC distribution grids or micro-grids. It is preferable to minimize the resistive power loss along the HFAC bus, which depends on among other things on the frequency, by for example optimizing the HFAC cable design and selecting an appropriate HFAC frequency. It may be also preferable to minimize the amount of reactive power on the HFAC bus to further reduce the power loss and increase the transfer efficiency of the HFAC bus, by for example minimizing the reactance of the HFAC bus and/or providing phase control capabilities to HF inverters. The HFAC power flow is unidirectional, occurring in the general direction from the HFAC sources, such as PV modules and HF micro-inverters, to the HFAC power sink in the form of the LF converter. Unlike a regular AC electrical grid, the HFAC bus may be unregulated, so that the voltage amplitude and harmonics content may vary in time and exceed the limits typically prescribed by the utility grids. Furthermore, HFAC power sources may operate synchronously or asynchronously with respect to each other.

Figure 15:
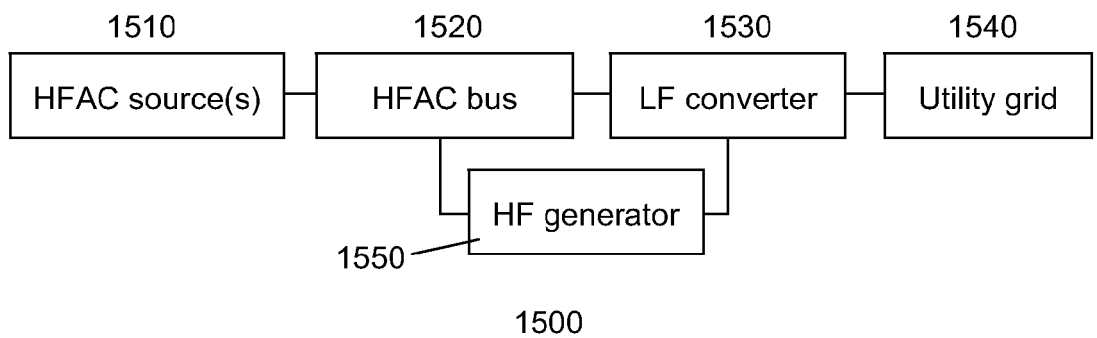
FIG. 15 illustrates a schematic diagram of an HFAC system having a high frequency (HF) generator in accordance with some embodiments of the present invention.

A synchronous operation of HF micro-inverters implies that they produce HFAC power and inject it into the HFAC bus at the same frequency and the same phase (or phases in the case of a multi-phase HFAC bus). This operation may be achieved in a number of different ways. For example, HF micro-inverters may be able to communicate with each other by power line communications or other means (wired or wireless) and exchange information about their status. In this case, one of the HF micro-inverters may take the role of a master controller, while the others may take the roles of slave devices and follow its commands to remain in a synchronous operation. Alternatively, the HFAC system may include an HF generator as shown in FIG. 15. In this case the HFAC system 1500 in addition to HFAC sources 1510, HFAC bus 1520 and LF converter 1530, also includes an HF generator or a frequency synthesizer 1550. The HF generator may comprise an oscillator or a resonant circuit tuned to operate at the HFAC frequency or other frequency. The HF generator may be a stand-alone element, or an internal part of either the HFAC bus or the LF converter connected in parallel to the HFAC sources. The HF generator may supply the reference signal for aiding in synchronous operation among different HFAC sources and/or HF micro-inverters. For example, the HF generator may provide a reference voltage or current at a frequency f. The HF micro-inverters may then use the phase lock-in technique to provide HFAC power output in phase with each other at a frequency nf, where n is an integer number, e.g. 2f. Phase lock-in technique at multiples of the reference frequency may be preferred, as it simplifies the HFAC system design. In this case the HFAC bus voltage may float, i.e. remain unregulated. The HF generator may also produce and distribute a reference signal wirelessly, e.g. by radio waves. In this case, the HF inverters or HFAC sources may be equipped with antennas to detect the clocking signal from the HF generator and synchronize their operation using it as an accurate time reference.

Figure 16:
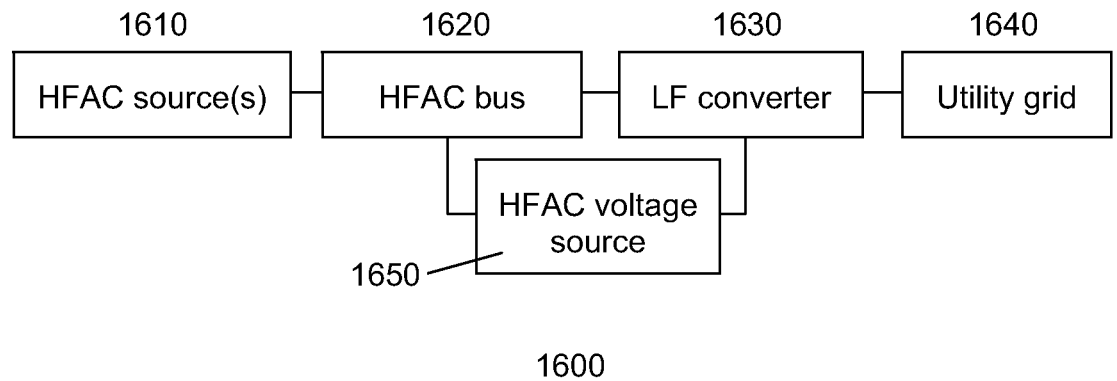
FIG. 16 illustrates a schematic diagram of an HFAC system having a HFAC voltage source in accordance with some embodiments of the present invention.

Also, the HFAC system may be configured as shown in FIG. 16, where HFAC system 1600, in addition to HFAC sources 1610, HFAC bus 1620 and LF converter 1630, also includes an HFAC voltage source 1650. The HFAC voltage source 1650 provides not only the frequency reference, but also a stable voltage reference. In this case the HF micro-inverters and any HFAC sources, in general, may be configured as current sources that can inject HFAC power into the HFAC bus synchronized with the HFAC voltage source. Since the HFAC bus is not connected directly to any real loads in these cases, there may be no need to restrict the harmonic content in the HFAC bus. Thus, in general, many different HFAC waveforms may be acceptable in these HFAC systems. In addition to sinusoidal waveforms, these include modified sine waves, square waves, trapezoidal and triangular waves, and others. Similarly, different types of reference HF and voltage waveforms, including pulsed waveforms, may be used for synchronization. The HFAC voltage source may be a stand-alone element, or an internal part of either the HFAC bus or the LF converter connected in parallel to the HFAC sources.

Figure 19:
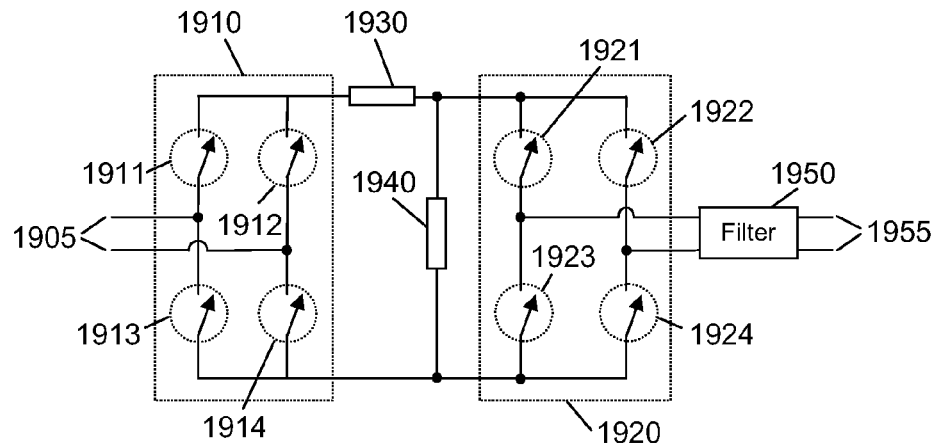
FIG. 19 illustrates a schematic diagram of a line frequency converter in accordance with some embodiments of the present invention.

Furthermore, an LF converter with improved capabilities may be built using a design with an active rectifying bridge as shown in the schematic layout of an LF converter 1900 in FIG. 19. The LF converter 1900 comprises an HFAC input 1905, an active switch rectifying bridge 1910, an LF inverter bridge 1920, in-series passive elements 1930, in-parallel passive elements 1940, a low-pass frequency filter 1950 and an AC output 1955. The rectifying bridge 1910 may comprise switches 1911, 1912, 1913 and 1914, while the inverting bridge 1920 may comprise switches 1921, 1922, 1923 and 1924. All of these switches may be actively controlled using control and drive electronics (not shown) associated with the LF converter 1900. These switches may be MOSFET, IGBT, other transistors, thyristors, GTO, and other power electronic devices with switching capabilities. The voltage at the input of the rectifying bridge 1910 is the HFAC voltage provided at the input 1905. The voltage at the input of the inverting bridge 1920 is the DC link voltage: for example in FIG. 19 the DC link voltage is the voltage across the passive elements 1940. The output of the rectifying bridge 1910 is substantially DC power, while the output of the inverting bridge 1920 is substantially AC power. The filter 1950 is used to eliminate high frequency harmonics from the output of the inverting bridge 1920 before injecting the AC power into the AC grid. Unlike a passive diode bridge, the active rectifying bridge 1910 may be able to directly control the DC link voltage. Also, the rectifying bridge 1910 may provide a bi-directional power flow and serve as a reverse inverter, e.g. by inverting the DC link voltage and providing a reference HFAC voltage to the HFAC bus via the input 1905. The active rectifying bridge 1910 may be used to control, maintain and regulate the HFAC bus voltage, which in turn may enable the synchronous operation of multiple HFAC sources, including HF micro-inverters in particular. Other implementations of the LF converter 1900 are of course possible. For example, an active rectifying switch bridge may be combined in parallel with a passive diode bridge to perform similar functions.

Multiple LF converters can be used in the same HFAC system to optimize its performance and costs. Typically, inverter or converter performance is at its peak efficiency within a relatively narrow range of input powers. However, the power produced by PV modules varies dramatically in time. To expand the range of optimum input powers, a master/slave combination of LF converters can be used, in which the master converter will control the operation of other converters and engage them as needed using power line communications (PLC) or other means. This configuration also simplifies system upgrades, since additional PV modules and converters can be "plug-and-play" components. At least one of these LF converters may be able to communicate with external monitoring systems and provide information about system status, its operation, and any system or component level alarms via PLC, Ethernet, wireless, or other communication links.

Figure 17:
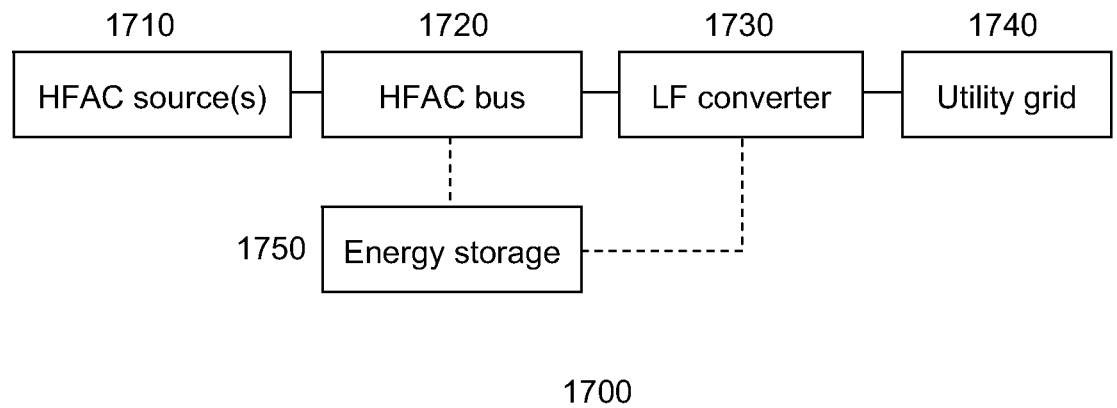
FIG. 17 illustrates a schematic diagram of an HFAC system having an energy storage element in accordance with some embodiments of the present invention.

Furthermore, capabilities of an HFAC system may be expanded by including an energy storage element, as in system 1700 shown in FIG. 17. The HFAC system 1700 comprises HFAC sources 1710, HFAC bus 1720, LF converter 1730, a connection to the utility grid 1740 and a storage element 1750, which can be one or more of a battery, fuel cell, flying wheel, supercapacitor, superconductor coil, and others. The storage element may 1750 be connected to HFAC bus 1720, the LF converter 1730 or both. The power flow from the storage element may be unidirectional, e.g. outward from the storage, or bi-directional. In the latter case, excess HFAC power may be used for energy storage, e.g. to charge a rechargeable battery, which can be released at a later time when there is a demand for greater AC power or lack of sufficient HFAC power. The energy from the storage element may be also used to control and regulate the HFAC voltage in the HFAC bus (e.g. via an active switch bridge such as bridge 1910 in FIG. 19).

Figure 20:
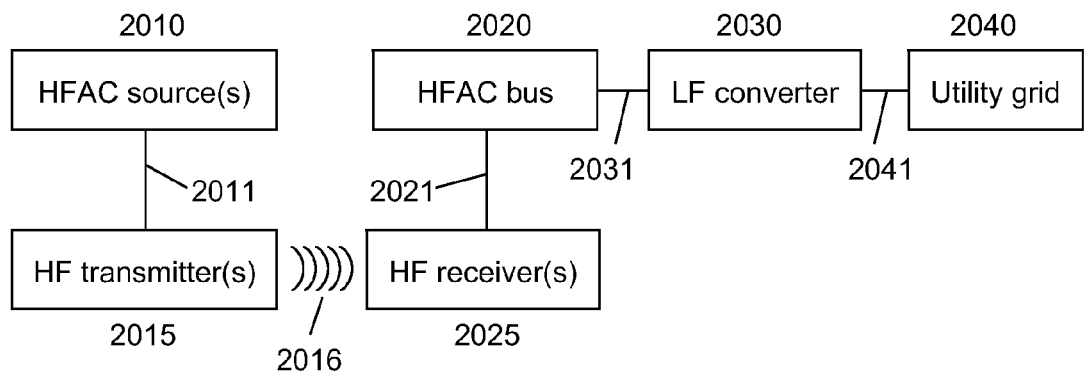
FIG. 20 shows an HFAC power harvesting system utilizing wireless power transfer in accordance with some embodiments of the present invention.

In accordance with at least some embodiments of the present invention, HFAC systems may include wireless power transfer sections. For example, in the HFAC section 1002 of the system 1000 in FIG. 10 the power transfer between the HFAC bus 1030 and other elements, such as HF micro-inverters 1020 and LF converter 1040, can be accomplished using wireless links rather than cables. Wireless power transfer is greatly facilitated by the use of HFAC and may be accomplished by providing coupled inductors on both sides of the wireless power link, i.e. wireless power transmitters and receivers, respectively. Wireless links can be separate devices or be integrated with other HFAC elements, such as HF micro-inverters, the HFAC bus, and the LF converter. This feature can be particularly attractive for building-integrated HFAC systems, where wireless links may be provide power transfer through existing structures, such as walls and windows. FIG. 20 shows an HFAC power harvesting system 2000 comprising one or more HFAC power sources 2010, an HFAC bus 2020, and an LF converter 2030. In addition, the HFAC system 2000 includes one or more of HF transmitters 2015 and receivers 2025 for wireless transfer of HFAC power via wireless links 2016. Transmitters 2015 in this case are connected to HFAC sources 2010 via wired links 2011, while receivers 2025 are connected to the HFAC bus 2020 via wired links 2021. Of course other wired links in this example may be replaced by a wireless transfer link, including an HFAC wired link 2031 between the HFAC bus 2020 and the LF converter 2030 and an LFAC wired link 2041 between the LF converter 2030 and the AC utility grid 2040.

The HFAC approach to PV system design advantageously enables significant simplification of micro-inverters and reduction of their cost, while preserving their essential ability to provide independent MPPT functions to separate PV modules (or any other DC source in general). At the same time, high-level functions are centralized in the LF converter that can monitor and directly or indirectly control HF micro-inverters. In this system, only the LF converter may need the smart-grid functionality, whereas the HF micro-inverters may remain simple and relatively unsophisticated. Also, the LF converter design and cost may be respectively simpler and cheaper than those of a regular inverter. This PV system design is simple, scalable and highly flexible, which allows lowering of certain balance-of-system (BOS) costs. Expensive DC-rated cabling is no longer necessary, as it is possible to use conventional AC cables and wiring for the HFAC bus. As a result of eliminating the DC wiring, the safety and reliability of a whole PV system can be improved. It is even possible to consider reusing existing AC wiring for transmitting HFAC power at a given site location. This approach eliminates the need for separate HFAC wiring and further lowers the system cost due to less materials and installation labor. These features can be particularly attractive for building-integrated PV (BIPV) solar systems, where the system design is often limited or affected by architectural, structural and other considerations.

HFAC PV systems offer a unique and extensive collection of highly beneficial features, technical advances and significant improvements over existing PV system architectures. Individual HF micro-inverters enable independent MPPT for each PV module, which is impossible in PV systems with central inverters. HF micro-inverters can be more compact, efficient and much less expensive than regular micro-inverters, due to smaller size components and reduced functionality. The LF converter enables centralized control and smart-grid functionality of a system, which is impossible in PV systems based on regular micro-inverters. Smart-grid functionality is obviously cheaper when concentrated only in a single electronic component. HF transformers lower system costs in comparison with regular PV systems. LF inverter design is also simplified in comparison to a regular inverter, making it more reliable and less expensive. Thermal load on electronics is distributed and therefore decreased, leading to improved reliability and efficiency. Importantly, the HFAC bus maintains galvanic isolation between DC and AC sides. Individual elements of HFAC PV systems, e.g. individual PV modules or HF micro-inverters, can be "plug-and-play" ready, i.e. they can be connected and disconnected to and from the system without its shut-down. PV BOS system costs are further reduced by avoiding the use of DC cabling. At the same time PV system reliability is increased by avoiding the use of DC cabling. The HFAC architecture can further lower costs by reusing existing AC wiring. Furthermore, the HFAC bus may enable wireless or connector-less power transfer, e.g. between an HF micro-inverter and HFAC bus, which may be especially useful in BIPV systems. HFAC PV system design is very flexible, which simplifies maintenance, repairs and upgrades. System and component warranty costs may be lowered by decentralizing major inverter functions and thus removing single points of failure. Maintenance down-time may be further reduced to increase system's energy return. It is also very adaptable to challenging site and geo-local conditions. HFACPV systems are highly scalable spanning capacities from about 1 kW to >10 MW.

EXAMPLES

Variations of the apparatus and methods described above are possible without departing from the scope of the invention.

Figure 18:
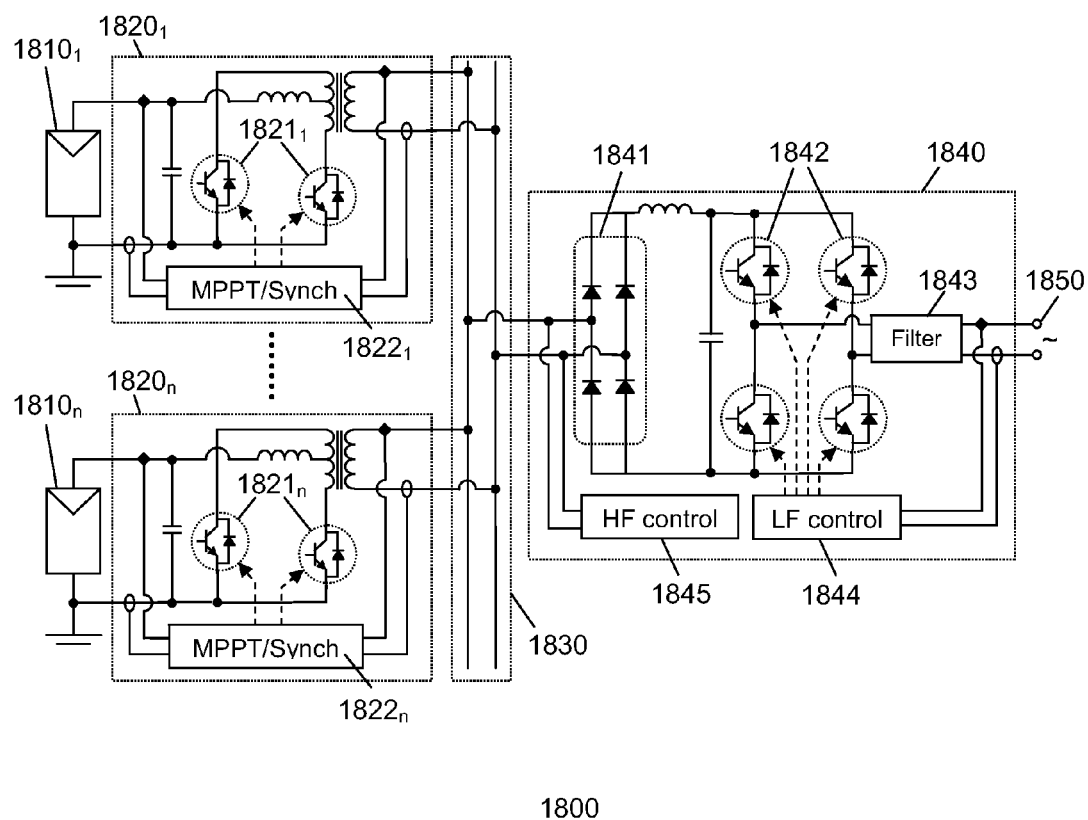
FIG. 18 illustrates a schematic diagram of an HFAC PV system in accordance with some embodiments of the present invention.

There are several implementations of HFAC PV systems described above. For instance the HF micro-inverter and LF converter can be thought of as parts of a "distributed" inverter with an HF conversion stage and a voltage-boosting HF transformer. HF transformers in general can be integrated either with the HF inverters or the LF converters; their use ensures galvanic isolation of the grid from the DC components. The LF converter could also operate as an HFAC bus voltage controller, while HF micro-inverters operate as HFAC current sources. A corresponding HFAC PV system $1800$ can be laid out accordingly as shown in FIG. 18, comprising n number of PV modules $1810_1$-$1810_n$, HF micro-inverters $1820_1$-$1820_n$, HFAC bus $1830$ and LF converter $1840$. In this case, the HF micro-inverters $1820_1$-$1820_n$ may be built using a half-bridge design with a center-fed HF transformer, for example as also shown in FIG. 11. The HFAC bus $1830$ may include a coaxial cable. The LF converter $1840$ may be built using a diode bridge rectifier $1841$ and a full bridge LF inverter with four switches $1842$ followed by a low-pass filter $1843$. The output of the LF converter $1850$ may be connected directly to the utility grid.

Each HF micro-inverter $1820_i$ in the HFACPV system $1800$ has an independent control module $1822_i$ which may provide multiple functionalities among which are at least MPPT and synchronization. Control modules $1822_i$ are able monitor input and output voltages and currents using internal sensors. Based on these readings, they can modulate switches $1821_i$ using PWM techniques and modify the output voltage and current depending on the input voltage and current to provide the maximum possible output power. At the same time control modules $1822_i$ are able to synchronize with each other to provide the HFAC output to the HFAC bus at the same frequency and phase. Depending on the system $1800$ layout, it may be possible and advantageous to provide phase shifts between different HF micro-inverters, in which case the controllers $1822_i$ may have an additional capability to provide a variable phase shift.

The LF converter $1840$ also has an independent control module $1844$, which is able to monitor and modify the LF output of the LF converter. The controller $1844$ provides PWM control signals to the switches $1842$ in order to maintain synchronization with the LF AC grid voltage. It also monitors conditions in the utility grid and is able to disconnect the HFAC PV system from the grid if needed. In addition, the LF controller may have a HF control module $1845$, which provides an HF reference signal for the HFAC bus. For example, the controller $1845$ may output a small HFAC voltage having a frequency f in the range of 0.5 to 50 kHz (a reference HFAC frequency). This reference voltage may be used by HF micro-inverter controllers $1822_1$-$1822_n$ to synchronize and phase-lock at a doubled frequency of 2f (an operating HFAC frequency) to produce and output HFAC power at the operating frequency of 1 to 100 kHz.

Alternatively, the diode bridge $1841$ may be replaced with an active rectifying bridge, such as the bridge $1910$ shown in FIG. 19, which can provide more efficient rectification and additional voltage control capabilities. In this case, switches in the active bridge may be controlled using a separate HF control module, which may be able to respond to changes in the DC link voltage of the LF converter $1840$ and the variations in the HFAC power flow from the HFAC bus. The HF micro-inverters $1820$ may then operate as current sources and synchronize to the HFAC voltage produced and regulated by the LF converter $1840$.

While the foregoing is directed to embodiments of the present invention, other and further embodiments of the invention may be devised without departing from the basic scope thereof.

The invention claimed is:

1. An apparatus for collecting and transmitting electrical power to an AC utility grid operating at a line frequency, comprising:
   a plurality of high frequency AC power sources, wherein the high frequency AC power sources operate synchronously;
   a high frequency AC bus, connected to each of the high frequency AC power sources;
   a line frequency converter, a power input of which is connected to the high frequency AC bus and a power output of which is connectable to the AC utility grid; and
   a high frequency voltage source connected to the high frequency AC bus to provide:
     a high frequency reference signal to the high frequency AC power sources to allow the high frequency AC power sources to operate synchronously, and
     a stable voltage reference to maintain a stable voltage in the high frequency bus.

2. The apparatus of claim 1, wherein at least one of the high frequency AC power sources comprises a DC power source and a high frequency inverter.

3. The apparatus of claim 2, wherein at least one of the DC sources comprises a photovoltaic device.

4. The apparatus of claim 1, wherein at least one of the high frequency AC power sources is a current source.

5. The apparatus of claim 1, wherein the line frequency converter comprises an active rectifying bridge.

6. The apparatus of claim 1, wherein at least one of the connections to the high frequency AC bus is wireless.

7. The apparatus of claim 1, wherein the power output of the line frequency converter is connected only to the AC utility grid.

8. The apparatus of claim 1, wherein the high frequency AC power sources are coupled to one another via a wired or wireless communications link to exchange status information between the high frequency AC power sources to allow the synchronous operation of the high frequency AC power sources.

9. The apparatus of claim 1, wherein the high frequency voltage source is separate from the AC utility grid.

10. A method for collecting and transmitting electrical power to an AC utility grid, which operates at a line frequency, comprising:
providing high frequency AC power at different locations;
synchronizing the high frequency AC power at the different locations by providing a high frequency reference signal that provides a reference frequency and a reference phase;
collecting the high frequency AC power onto a common bus;
providing a stable voltage reference to maintain a stable voltage in the common bus;
converting the high frequency AC power from the common bus into line frequency AC power; and
injecting the line frequency AC power into the AC utility grid.

11. The method of claim 10, wherein the high frequency AC power is provided by converting DC power from a photovoltaic source at least one location.

12. The method of claim 11, wherein converting DC power is provided by at least one high frequency inverter.

13. The method of claim 10, wherein the synchronizing the high frequency AC power at different locations includes providing the high frequency reference signal to the common bus.

14. The method of claim 10, wherein the high frequency AC power at different locations is provided by high frequency AC power sources and the synchronizing the high frequency AC power at different locations includes providing the high frequency reference signal to the high frequency AC power sources and operating the high frequency AC power sources as synchronous current sources.

15. The method of claim 10, wherein converting the high frequency AC power from the common bus into the line frequency AC power is provided by receiving and rectifying the high frequency AC power in at least one location to produce DC power and inverting the DC power to produce AC power at the line frequency, wherein the produced AC power is synchronized with the AC utility grid.

16. The method of claim 10, further comprising:
exchanging status information between the high frequency AC power sources via a wired or wireless communications link to synchronize the high frequency AC power sources at the different locations.

17. The method of claim 10, wherein the synchronizing the high frequency AC power at the different locations includes providing the high frequency reference signal from a high frequency generator separate from the AC utility grid.

18. A method for producing a high frequency AC power system, comprising:
providing a plurality of high frequency AC power sources;
synchronizing the high frequency AC power sources by providing a high frequency reference signal that provides a reference frequency and a reference phase to the high frequency AC power sources;
connecting outputs of the high frequency AC power sources to a common bus;
providing a stable voltage reference to maintain a stable voltage in the common bus;
connecting the common bus to a power input of at least one line frequency converter; and
providing connections from a power output of the at least one line frequency converter to an AC utility grid.

19. The method of claim 18, wherein providing a plurality of high frequency AC power sources includes providing at least one DC source and connecting the DC source to an input of a high frequency inverter.

20. The method of claim 19, wherein providing at least one DC source includes providing at least one PV device.

21. The method of claim 18, wherein the high frequency AC power system is produced at a site with pre-existing electrical wiring and further comprising utilizing the pre-existing electrical wiring for connecting any of the high frequency AC power sources, the common bus, the at least one line frequency converter and the AC utility grid.

22. The method of claim 18, wherein providing connections from the output of the at least one line frequency converter to the AC utility grid comprises providing connections from the output of the at least one line frequency converter to only the AC utility grid.

23. The method of claim 18, further comprising:
exchanging status information between the high frequency AC power sources via a wired or wireless communications link to synchronize the high frequency AC power sources.

24. The method of claim 18, wherein the synchronizing the high frequency AC power sources includes providing the high frequency reference signal from a high frequency generator separate from the AC utility grid.

* * * * *